US012806121B2

(12) United States Patent
Takeuchi et al.

(10) Patent No.: US 12,806,121 B2
(45) Date of Patent: Nov. 24, 2026

(54) COMBINATION CONNECTOR AND SYSTEM FOR ENTERAL FEEDING

(71) Applicant: Avent, Inc., Alpharetta, GA (US)

(72) Inventors: James M. Takeuchi, Woodstock, GA (US); Michael A. Kenowski, Alpharetta, GA (US)

(73) Assignee: Avent, Inc., Alpharetta, GA (US)

( * ) Notice: Subject to any disclaimer, the term of this patent is extended or adjusted under 35 U.S.C. 154(b) by 0 days.

(21) Appl. No.: 18/416,958

(22) Filed: Jan. 19, 2024

(65) Prior Publication Data

US 2025/0235388 A1 Jul. 24, 2025

(51) Int. Cl.
*A61J 15/00* (2006.01)

(52) U.S. Cl.
CPC ....... *A61J 15/0015* (2013.01); *A61J 15/0026* (2013.01)

(58) Field of Classification Search
CPC ................ A61J 15/0015; A61J 15/0026; A61J 15/0065; A61J 15/0057; A61M 2039/1094; A61M 2039/1077
USPC ........................................................ 604/93.01
See application file for complete search history.

(56) References Cited

U.S. PATENT DOCUMENTS 4,266,813 A * 5/1981 Oliver ..................... F16L 25/14 285/423
6,415,937 B1 * 7/2002 DeJong .................... A61J 11/04 215/11.1
2010/0022986 A1 * 1/2010 Breuer-Thal .......... A61J 1/1418 604/533
2016/0158110 A1 6/2016 Swisher et al.
2016/0317393 A1 * 11/2016 Davis .................... A61M 5/345
2016/0354594 A1 * 12/2016 Uehara ................. A61M 39/10
2016/0361497 A1 12/2016 Swisher et al.
2017/0014616 A1 1/2017 Davis et al.
2020/0093705 A1 3/2020 Swisher

OTHER PUBLICATIONS

International Search Report and Written Opinion from corresponding PCT/US2025/012090, dated May 7, 2025, 15 pages.

* cited by examiner

*Primary Examiner* — Philip E Stimpert
(74) *Attorney, Agent, or Firm* — Meunier Carlin & Curfman LLC

(57) ABSTRACT

A combination connector and enteral feeding system including the combination connector are disclosed. The connector includes a first connector element, a second connector element, a lumen extension tip, and a port. The first connector element includes a first sidewall and a first thread profile on an inner surface of the first sidewall that is configured to couple with a threaded fitting of a wide-mouth connector. The second connector element includes a second sidewall, and an inner surface of the second sidewall has a connection surface configured to couple with a medical connector. The lumen extension tip extends from a bottom of the second connector element and is disposed within the second connector element. The port is configured to couple to tubing. In an enteral feeding system, a tubing is coupled to the port.

21 Claims, 8 Drawing Sheets

COMBINATION CONNECTOR AND SYSTEM FOR ENTERAL FEEDING

FIELD OF THE INVENTION

The subject matter of the present invention relates to connectors used for enteral feeding systems, and more specifically a connector that is able to facilitate a connection between more than one type of nutrition container.

BACKGROUND

Enteral nutrition, also known as tube feeding, is a way of delivering nutrition directly to the stomach or small intestine. There are many issues encountered by users of enteral feeding devices and accessories today. For example, in order to facilitate an enteral feeding, a nutrition container must first be connected to a delivery system via a specific connector body for the nutrition container. Enteral feeding devices commonly contain multiple connector types to facilitate connections with different types of devices and accessories. Multiple connectors and connection points can often be confusing and burdensome for the user and are also costly for the manufacturer. In general, there is a great need for a simpler, more cost-effective solution in the market of enteral feeding devices and accessories.

Accordingly, improved connectors which simplify the connection between multiple types of enteral feeding materials and accessories are desired in the art. In particular, a connector that allows for connection to both a wide-mouthed container and a syringe in a single, integrated component would be advantageous.

SUMMARY

Objects and advantages of the invention will be set forth in part in the following description, or may be obvious from the description, or may be learned through practice of the invention.

In accordance with one embodiment, a connector component is provided. The connector component includes a connector body having: a first connector element comprising a first sidewall, a first thread profile on an inner surface of the first sidewall, the first thread profile being configured to couple with a threaded fitting of a wide-mouth connector; a second connector element comprising a second sidewall, an inner surface of the second sidewall comprising a connection surface configured to couple with a medical connector; and a port configured to couple to tubing. The first connector element has an inner diameter greater than an outer diameter of the second connector element. The second connector element has an inner diameter greater than the lumen. The first connector element is coaxial with the second connector element, and the second connector element is concentric with the lumen. The first connector element, the second connector element, and the port are formed as one piece.

In accordance with another embodiment, an enteral feeding system is provided. The enteral feeding system includes a connector component and tubing coupled to the connector component. The connector component includes a first connector element comprising a first sidewall, a first thread profile on an inner surface of the first sidewall, the first thread profile being configured to couple with a threaded fitting of a wide-mouth connector; a second connector element comprising a second sidewall, an inner surface of the second sidewall comprising a connection surface configured to couple with a medical connector; and a port. The tubing is coupled to the port.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in FIG. 1 illustrates a cross-sectional view of a combination connector body according to one particular embodiment of the present disclosure.

DETAILED DESCRIPTION

Figure 1:
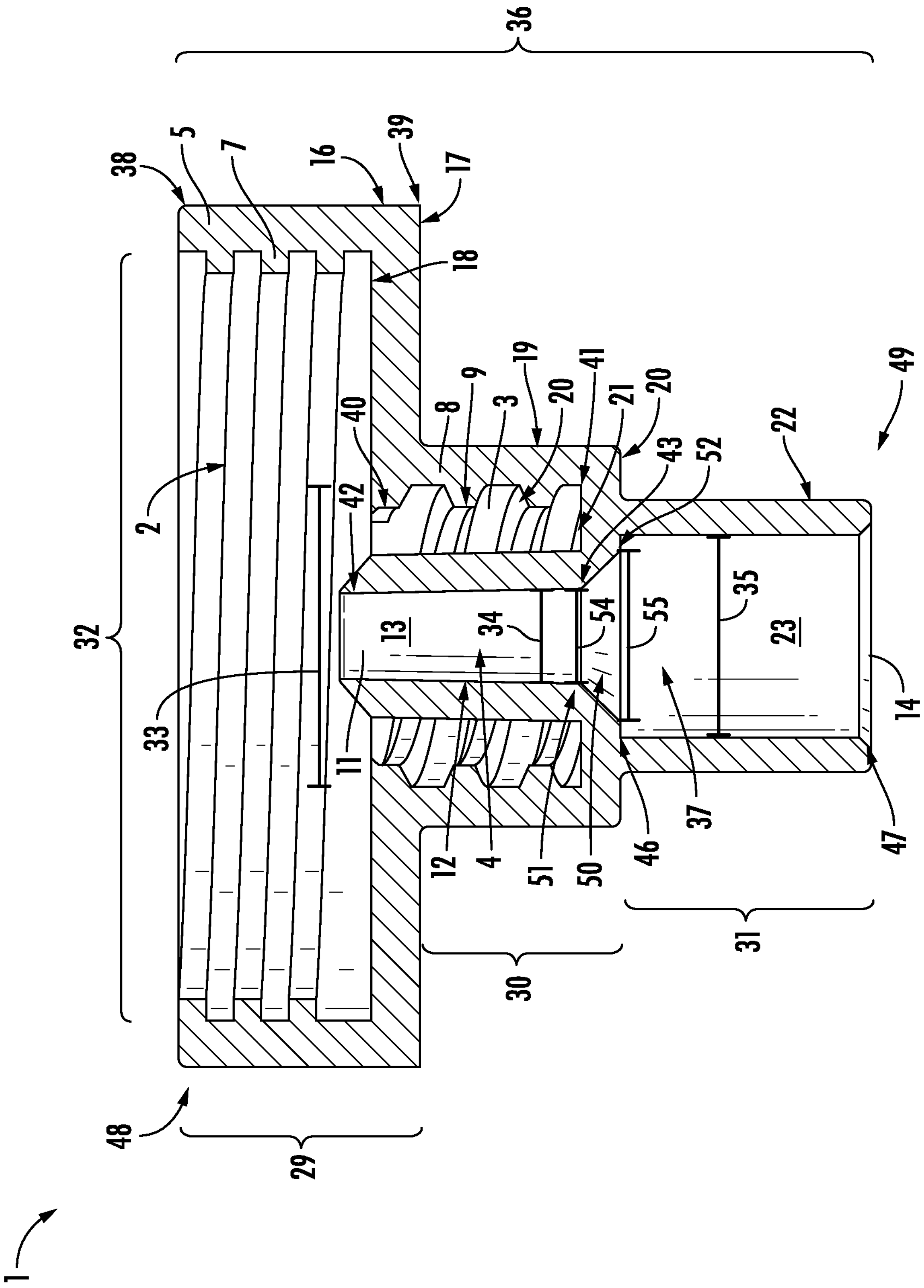

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

When used to describe a shape, the term "generally" or "essentially" is used to describe an object having the overall appearance of a shape and may include slight deviations from the exact shape, such as including one or more protrusions or indentations in the outline of the shape. For example, the term "essentially cylindrical" may be used to describe an object having the overall appearance of a cylinder having straight parallel sides and a circular or oval cross section but may include one or more indentations and/or protrusions along the parallel sides. For instance, a cylindrical shape having slightly a slightly indented outer surface may be described as "essentially cylindrical".

Unless specified or limited otherwise, the terms "mounted," "connected," "supported," and "coupled" and variations thereof are used broadly and encompass both direct and indirect mountings, connections, supports, and couplings. Additionally, unless specified or limited otherwise, the terms "lower," "upper," and variations thereof are used broadly for the purposes of describing relative positions of elements of the illustrated embodiments.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Generally speaking, the present disclosure is directed to a combination connector having a first connector element, a first thread profile, a second connector element configured to have a smooth or threaded connection surface, and a lumen extension tip forming a lumen for enteral nutrition to be delivered from a nutrition container to an individual through a gastric or jejunal port. Thus, the device is capable of simplifying enteral feeding methods by only requiring the user to apply one connector body for any nutrition container, as opposed to choosing between multiple connectors. Specifically, the combination connector body eliminates the use of connectors that are specifically adapted to fit only one type of nutrition container. The specific features of the combination connector and system for enteral feeding of the present disclosure may be better understood with references to FIGS. 1-8.

Figure 2:
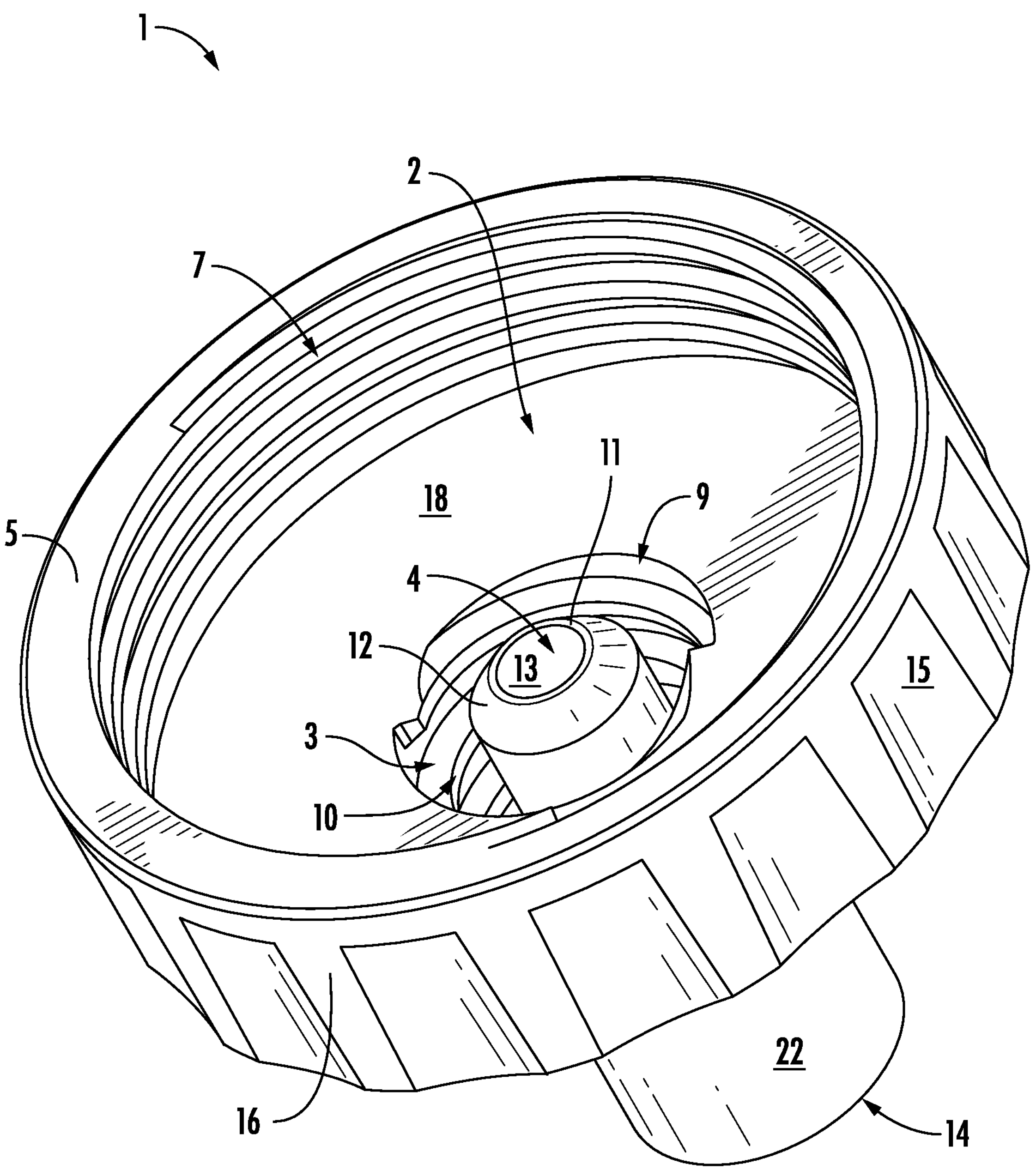
FIG. 2 illustrates a perspective view of a combination connector body according to one particular embodiment of the present disclosure.

Referring now to FIGS. 1 and 2, one embodiment of a combination connector body 1 is shown. The combination connector body 1 includes a port 14 to connect to a feeding tube 325 (see FIG. 5) at a first end 49, e.g., a proximal end, of the combination connector body 1 and a connector having a first connector element 2 configured for connection to a wide mouth container and a second connector element 3 configured for connection with a narrow neck container, e.g., a syringe, at a second end 48, e.g., a distal end, of the combination connector body 1.

As best seen in FIG. 1, the combination connector body 1 may include a first connector element 2 configured to facilitate coupling with a wide mouth container or a medical connector, including but not limited to an off-the-shelf enteral nutrition carton, a reusable carton or bottle, a nutrition bag, or other container configured to be filled with enteral nutrition. The first connector element 2 may include a first sidewall 5, a first thread profile 7, an endwall 17, an outer surface 16 of the first sidewall 5, and a bottom surface 18 of the first connector element 2. The first connector element 2 may additionally include a gripping surface 15 on the outer surface 16 of the first sidewall 5.

As best seen in FIG. 2, the first connector element 2 may be configured to facilitate coupling to wide-mouth container or medical connector. An inner surface of the first sidewall 5 may have a first thread profile 7 configured to form a female coupling configured to receive and/or engage with a male threaded fitting of the wide-mouth container or medical connector. The first thread profile 7 may include threads protruding radially inward from the first sidewall 5. The first thread profile 7 may be complementary to a male threaded portion of the wide-mouth container or medical connector. The first connector element 2 may have an inner diameter 32. The inner diameter 32 may be in a range of about 2 cm to about 7.5 cm.

As best seen in FIG. 1, the combination connector body 1 may additionally include a second connector element 3. The second connector element 3 may include a second sidewall 8, a connection surface 9, an outer surface of the second sidewall 19, an endwall 20, and a bottom surface 21 of the second connector element 3. As best seen in FIG. 2, the second connector element 3 may include a lumen extension tip 11 extending radially through the second connector element 3. As will be described in further detail below, the second connector element 3 may be in fluid communication with the port 14, e.g., via a lumen or channel 37 of the port 14 through the lumen extension tip 11. The second connector element 3 may have a distal end 40 near the proximal end 39 of the first connector element 2. For instance, the second connector element 3 may have a distal end 40 directly adjacent to the proximal end 39 of the first connector element 2. The second connector element 3 may additionally have a proximal end 41 near the distal end 42 of the lumen 4 of the lumen extension tip 11. For instance, the second connector element 3 may have a proximal end 41 directly adjacent to the distal end 42 of the lumen extension tip 11.

As best seen in FIG. 1, the second connector element 3 may have a second thread profile 10 on a connection surface 9. The second thread profile 10 may be configured on the connection surface 9 of the second sidewall 8 to facilitate coupling to a syringe or medical connector having a narrower diameter than a wide-mouth connector configured to couple with the first connector element 2. For instance, the second thread profile 10 may form a female coupling on the connection surface 9 configured to receive a male coupling of the syringe or medical connector. The second thread profile 10 may be complementary to a male threaded portion of the syringe or medical connector. In some embodiments, the second thread profile 10 is compliant with the ISO 80369-3 enteral connector standard. The second connector element 3 may have an inner diameter 33. The inner diameter 33 may be in a range of about 1 cm to about 2.5 cm.

Additionally, the combination connector body 1 may include surface texture 59 on the first sidewall 5 of the first connector element 2, on the second sidewall 8 of the second connector element 3, and/or on the outer sidewall 12 of the lumen extension tip 411. For instance, surface texture 59 may be added to an inner surface of the first sidewall 5, an inner surface of the second sidewall 8, the bottom surface 18 of the first connector element 2, and/or the bottom surface 21 of the second connector element 3 to allow air passage or venting during use. In other words, the surface texture 59 enables the combination connector body 1 to allow venting of air during use, i.e., to prevent formation of a vacuum in a medical connector, syringe, enteral nutrition source, or other container coupled with the proximal end of the combination connector body 1 upstream of the port 14.

As best seen in FIG. 1, the combination connector body 1 may additionally include a lumen extension tip 11. The lumen extension tip 11 may be defined by a sidewall 12 having an inner surface 13 defining a lumen 4 therethrough. The lumen 4 may be in fluid communication with the port 14 via a lumen or channel 37 of the port 14. The lumen 4 may have a distal end 42 near the first cavity 2 and a proximal end 43 near the port 14.

As best seen in FIG. 1, the combination connector body 1 may additionally include a port 14. The port 14 may include an outer surface 22 and an inner surface 23. The port 14 may include a channel 37 therethrough that is in fluid communication with the lumen 4 as described above. The channel 37 may have a distal end 48 near a proximal end 43 of the lumen 4 and a proximal end 46 at a proximal end 49 of the combination connector body 1. In some embodiments, the distal end 47 of the channel 37 may be directly adjacent to the proximal end 43 of the lumen 4. The port 14 may additionally include an inner diameter 35 in a range from about 0.5 cm to about 2 cm. The inner diameter 35 of the port 14 may equal an outer diameter of the channel 37.

Figure 5:
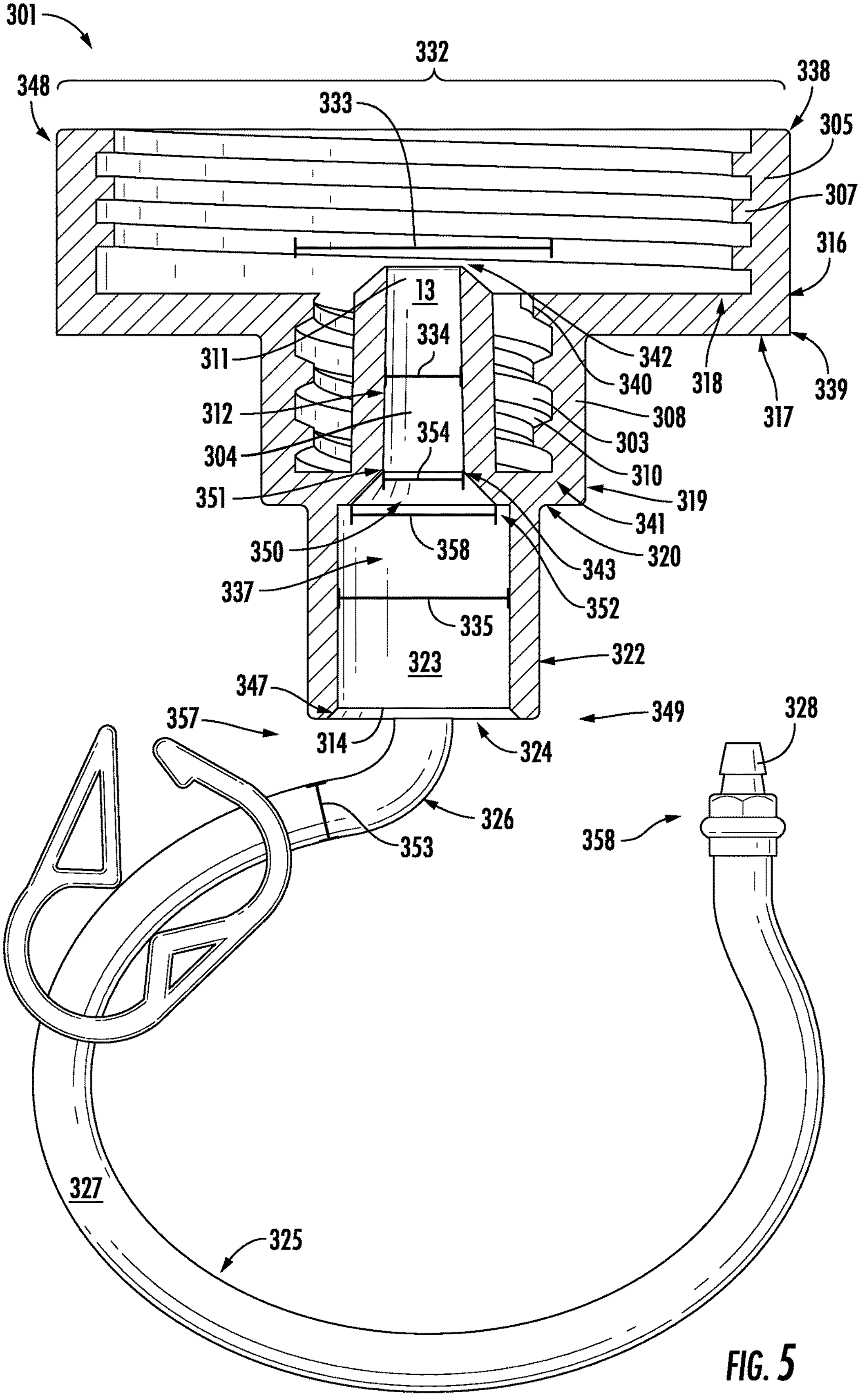
FIG. 5 illustrates a cross-sectional view of an enteral feeding system according to one particular embodiment of the present disclosure.

The port 14 may facilitate coupling to a feeding tube 325 ("tubing") or enteral feeding accessory (see FIG. 5). For instance, the inner diameter 35 of the channel 37 may correspond to an outer diameter 53 of a feeding tube 325. The port 14 may be coupled to a feeding tube 325 on the proximal end 45 of the port 14. The port 14 may be coupled to the lumen extension tip 11 at the distal end of the port 14 through a tapered section 50. The tapered section 50 may be formed through the endwall 20. For instance, the tapered section 50 may taper from the channel 37 to the lumen 4, i.e., widening from the lumen 4 to the channel 37.

As best seen in FIG. 1, a tapered section 50 may be formed between the channel 37 and the lumen 4, e.g., through the endwall 20. The tapered section 50 may have a distal end 51 formed at the proximal end 43 of the lumen 4, and a proximal end 52 formed at the distal end 46 of the channel 37. The tapered section 50 may have a first diameter 54 at the proximal end 43 of the lumen 4. The tapered section 50 may have a second diameter 55 at the distal end 46 of the channel 37. For instance, the first diameter 54 may be a minimum diameter of the tapered section 50, and the second diameter 56 may be a maximum diameter of the tapered section 50.

As shown in FIG. 1, the first connector element 2, second connector element 2, lumen extension tip 11, and port 14 may all be disposed in a coaxial arrangement, i.e., extending about a common longitudinal axis.

As best seen in FIG. 1, the combination connector body 1 may have a height 36 or length in a range from about 2 cm to about 10 cm. Along the length, the body 1 may include a first step portion 29, a second step portion 30, and a third step portion 31. The first step portion 29 may encase the first connector element 2. The second step portion 30 may encase the second connector element 3. The third step portion 31 may encase the port 14.

As best seen in FIG. 1, the diameter 32 of the first connector element 2 may be greater than the second connector element diameter 33 and the lumen diameter 34. The second connector element 3 may have a diameter 33 that is less than the first connector element diameter 32. The lumen 4 may have a diameter 34 that is less than the channel diameter 35. The distal end 38 of the first connector element 2 may be directly adjacent to and/or form the distal end 48 of the combination connector body 1. The proximal end 39 of the first connector element 2 may be directly adjacent to the distal end 40 of the second connector element 3. The distal end 40 of the second connector element 3 may be directly adjacent to the proximal end 39 of the first connector element, and the proximal end 41 of the second connector element 3 may be directly adjacent to the distal end 46 of the channel 37. The lumen 4 may be concentric with the second cavity 3. The distal end 51 of the tapered section 50 may be directly adjacent to the proximal end 43 of the lumen 4. The proximal end 52 of the tapered section 50 may be directly adjacent to the distal end 46 of the channel 37. The proximal end 47 of the channel 37 may be near the proximal end 49 of the combination connector body 1. For instance, the proximal end 47 of the channel 37 may be directly adjacent to the proximal end 49 of the combination connector body 1.

As illustrated in FIG. 1, in some embodiments, the combination connector body 1 may be formed as one piece. For instance, the combination connector body 1 may be formed of unitary construction, e.g., from a single piece of material. In some aspects, the combination connector body 1 may comprise a rigid plastic material and may be formed, e.g., by molding. In some embodiments, the combination connector body 1 may be formed from a resilient material having a sufficient durometer to hold its shape to be coupled with a nutrition container and/or a feeding tube. A resilient material may improve seal(s) formed between the combination connector body 1 and a nutrition container, a syringe or medical connector, and/or a tube. For instance, a resilient material may have sufficiently high durometer to maintain the ability to provide a threaded coupling while flexing around complementary coupling features to provide a seal.

In some embodiments of the invention, the second connector element 3 and/or the lumen extension tip 11 may be formed from a second material different from a first material of the first connector element 2 and/or port 14. For instance, the second connector element 3 may be formed from a flexible material and/or resilient material such as a thermoplastic material, a silicone material, and/or a rubber material. A resilient material may improve a seal formed between the second connector element 3 and a syringe or medical connector, as described above.

Figure 3:
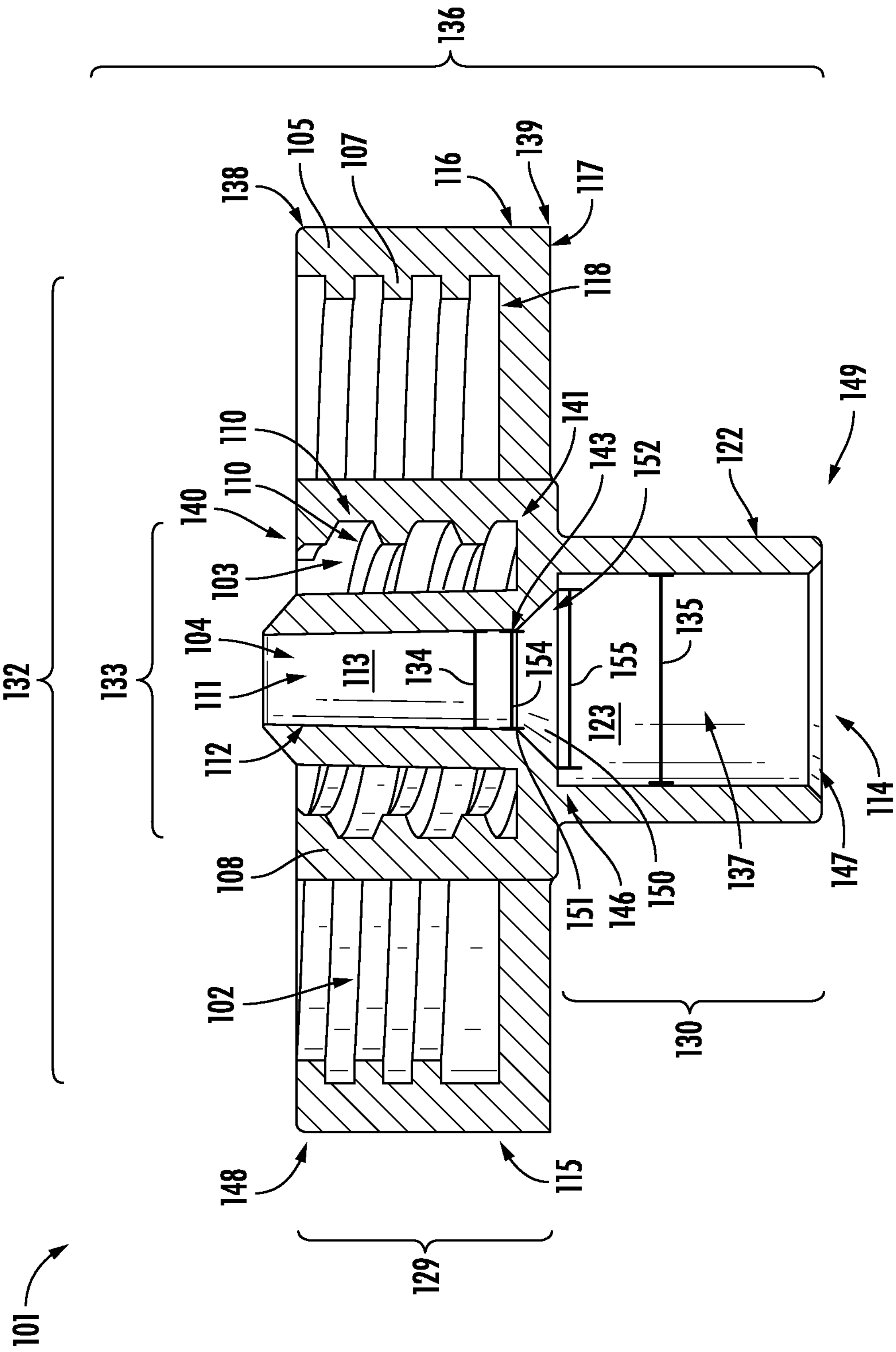
FIG. 3 illustrates a cross-sectional view of a combination connector body where the first and second cavities are concentric according to one particular embodiment of the present disclosure.

Referring now to FIG. 3, in another aspect of the present invention, the first connector element 102 may concentrically surround the second connector element 103. Stated differently, the first connector element 102 may radially surround the second connector element 103 along a common longitudinal axis of the body 101. The combination connector body 101 includes a port 114 configured to connect to a feeding tube 325 (see FIG. 5) at the proximal end 149 of the combination connector body 101 and a first connector element 102 and a second connector element 103 to couple with a nutrition container on the distal end 148 of the combination connector body 101.

As seen in FIG. 3, the combination connector body 101 may include a first connector element 102 configured to facilitate coupling with a wide mouth container or a medical connector. The first connector element 102 may include a first sidewall 105, a first thread profile 107, an endwall 117, an outer surface 116 of the first sidewall 105, and an inner surface 118 of the first connector element 102. The first connector element 102 may additionally include a gripping surface 115 on the outer surface 116 of the first sidewall 105 (see FIG. 2).

As seen in FIG. 3, the first connector element 102 may be configured to facilitate coupling to a wide-mouth container or medical connector. The first sidewall 105 may have a first thread profile 107 configured to form a female coupling configured to receive a male threaded portion of the wide-mouth container or medical connector. The first thread profile 107 may be complementary to the male threaded portion of the wide-mouth container or medical connector. The first connector element 102 may have an inner diameter 132 approximately equal to inner diameter 32 as described above.

As seen in FIG. 3, the combination connector body 101 may additionally include a second connector element 103. The second connector element 103 may include a second sidewall 108, a connection surface 109, an outer surface 119 of the second sidewall 108, a bottom surface 120 of the outer sidewall 108, and a bottom surface 121 of the second connector element 103. The second connector element 103 may include a lumen extension tip 111 extending radially through the second connector element 103. As will be described in further detail below, the second connector element 103 may be in fluid communication with the port 114 via a lumen or channel 137 that connects with a lumen 104 through the lumen extension tip 111. The second connector element 103 may have a distal end 140 near the proximal end 139 of the first connector element 102. For instance, the second connector element 103 may have a distal end 140 directly adjacent to the proximal end 139 of the first connector element 102. The second connector element 103 may additionally have a proximal end 141 near the distal end 142 of the lumen 104. For instance, the second connector element 103 may have a proximal end 141 directly adjacent to the distal end 142 of the lumen 104.

As seen in FIG. 3, the second connector element 103 may have a second thread profile 110 on a connection surface 109. The second thread profile 110 may be configured on the connection surface 109 of the second sidewall 108 to facilitate coupling to a syringe or medical connector. For instance, the second thread profile 110 may form a female coupling on the connection surface 109 configured to receive a male coupling of the syringe or medical connector. The second thread profile 110 may be complementary to the male threaded portion of the syringe or medical connector. The second connector element 103 may have an inner diameter 133 approximately equal to inner diameter 33 as described above.

As seen in FIG. 3, the combination connector body 101 may additionally include a lumen extension tip 111. The lumen extension tip 111 may be defined by a sidewall 112 having an inner surface 113 defining a lumen 104 therethrough. The lumen 104 may be comprised of a lumen or channel 137 in fluid communication with the port 114. The lumen 104 has a distal end 142 near the distal end 38 of the first connector element 102 and a proximal end 143 near adjacent to the channel 137 of the port 114.

As seen in FIG. 3, the combination connector body 101 may additionally include a port 114. The port 114 may include an outer surface 122 and an inner surface 123. The port 114 may form a channel 137 that is in fluid communication with the lumen 104 as described above. The channel 137 may have a distal end 148 near the proximal end 143 of the lumen 104. The channel 137 may have a proximal end 146 at the proximal end 149 of the combination connector body 101. In some embodiments, the distal end 147 of the channel 137 may be directly adjacent to the proximal end 143 of the lumen 104. The port 114 may have an inner diameter 135 approximately equal to inner diameter 35 as described above. The port 114 may facilitate coupling to a feeding tube 325 or enteral feeding accessory (see FIG. 5). For instance, the diameter 135 may correspond to an outer diameter 153 of a feeding tube 325. The port 114 may be coupled to a feeding tube 325 at the proximal end 145 of the port 114. The port 114 may be directly adjacent to the lumen extension tip 111 on the distal end 144 of the port 114 by a tapered section 50.

As seen in FIG. 3, the tapered section 150 may be formed between the channel 137 and the lumen 104. The tapered section 150 may have a distal end 151 formed at the proximal end 143 of the lumen, and a proximal end 152 formed at the distal end 146 of the channel 137. The tapered section 150 may have a first diameter 154 configured to couple with the proximal end 143 of the lumen 104. The tapered section 150 may additionally have a second diameter 155 configured to couple with the distal end 146 of the channel 137.

As seen in FIG. 3, the combination connector body 101 may have a height 136 extending along a length of the body 101. The height 136 may be in a range from about 1.5 cm to about 8 cm. The height 136 is shorter than the height 36 at least because the combination connector body 101 has only two step portions as described below. Along a length of the body 101, the body 101 may include a first step portion 129 and a second step portion 130. The first step portion 129 extends from the distal end 138 of the first connector element 102 to the proximal end 139 of the first connector element 102. The first step portion 129 may include the first connector element 102, the second connector element 103, and the lumen extension tip 111. The second step portion 130 extends from the distal end 144 of the port 114 to the proximal end 145 of the port 114. The second step portion 130 may include the port 114 and the channel 137.

As seen in FIG. 3, the diameter 132 of the first connector element 102 may be greater than the second connector element diameter 133 and the lumen diameter 134. The second connector element 103 may have a diameter 133 that is less than the first connector element diameter 132. The lumen 104 may have a diameter 134 that is less than the channel diameter 135. The distal end 138 of the first connector element 102 may be directly adjacent to the distal end 140 of the second connector element 103. The proximal end 139 of the first connector element 102 may be directly adjacent to the proximal end 141 of the second connector element 103, e.g., in a radial direction. The distal end 140 of the second connector element 103 may be aligned with the distal end 142 of the lumen 104 in a radial direction. The proximal end 141 of the second connector element 103 may be directly adjacent to the proximal end 143 of the lumen 104, e.g., in a radial direction.

As seen in FIG. 3, the first connector element 102 may be concentric with the second connector element 103. The second connector element 103 may be concentric with the lumen 104.

Figure 4:
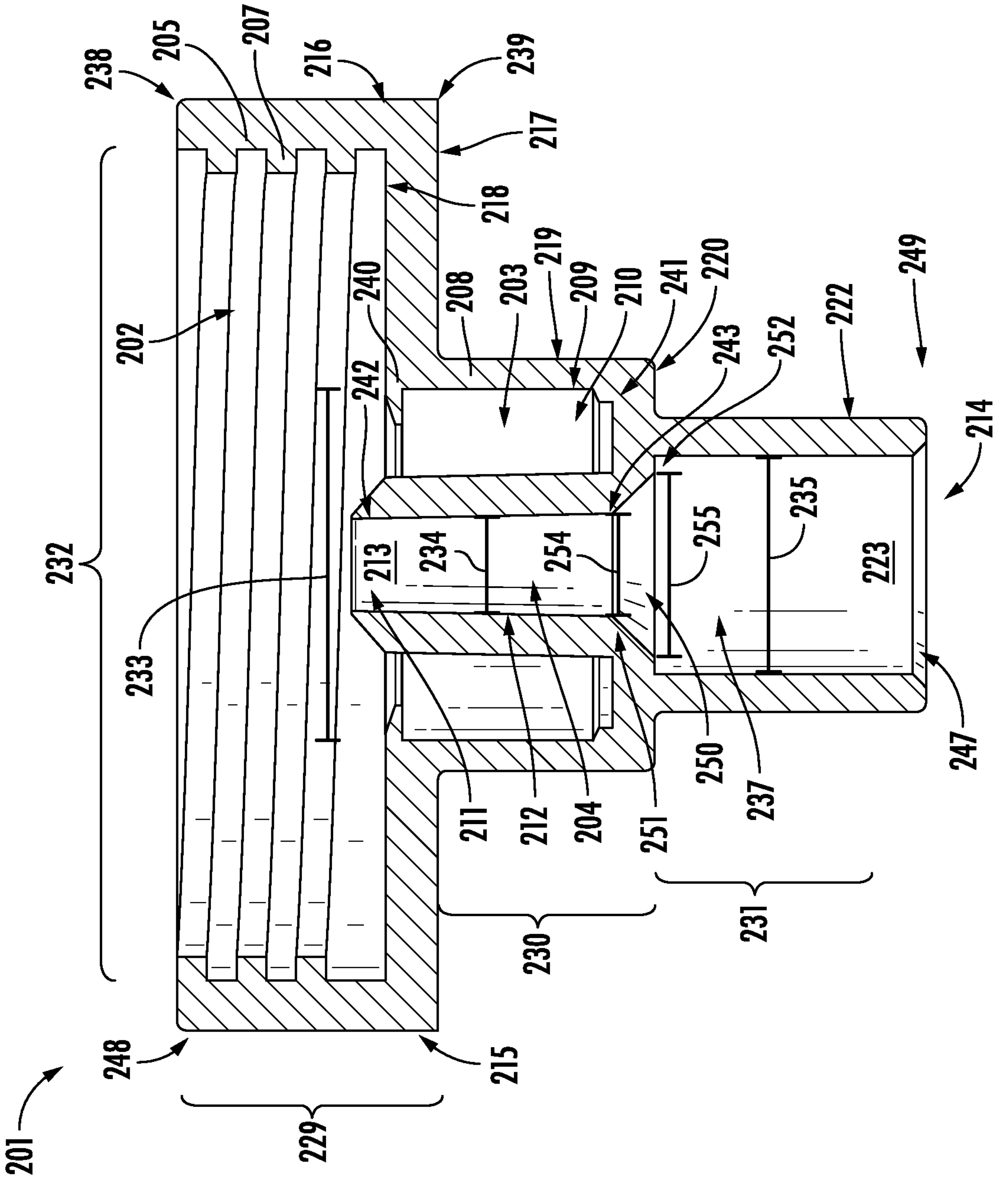
FIG. 4 illustrates a cross-sectional view of a combination connector body where the second connector element is adapted to receive a medical connector via a press-fit, interference connection, according to one particular embodiment of the present disclosure.

Referring now to FIG. 4, in another aspect of the present invention, the combination connector body 201 may have a second connector element 203 having a connection surface 209 configured to facilitate a press-fit connection with a syringe or medical connector. The combination connector body 201 may include a port 214 to connect a feeding tube 325 on the proximal end 249 of the combination connector body 201 and a first connector element 102 and a second connector element 103 to couple with a nutrition container on the distal end 248 of the combination connector body 201.

As seen in FIG. 4, the combination connector body 201 may include a first connector element 202 configured to facilitate coupling with a wide-mouth container or a medical connector. The first connector element 202 may include a first sidewall 205, a first thread profile 207, an endwall 217, an outer surface of the first sidewall 216, and a bottom surface of the first connector element 218. The first connector element 202 may additionally include a gripping surface 215 on the first outer surface 216 of the first sidewall 205.

As seen in FIG. 4, the first connector element 202 may be configured to facilitate coupling to a wide-mouth container or medical connector. The first sidewall 205 may have a first thread profile 207 configured to form a female coupling configured to receive a male threaded portion of the wide-mouth container or medical connector. The first thread profile 207 may be complementary to a male threaded portion of the wide-mouth container or medical connector. The first connector element 202 may have an inner diameter 232 approximately equal to inner diameter 32 as described above.

As seen in FIG. 4, the combination connector body 201 may additionally include a second connector element 203. The second connector element 203 may include a second sidewall 208, a connection surface 209, an outer surface of the second sidewall 219, an endwall 220, and a bottom surface 221 of the second connector element 203. The second connector element 203 may include a lumen extension tip 211 extending radially through the second connector element 203.

As seen in FIG. 4, the second connector element 203 may have a smooth profile 210 on a connection surface 209. The smooth profile 210 may be configured on the connection surface 209 of the second sidewall 208, e.g., on a radially inner surface of the second sidewall 208, to facilitate a press-fit, friction fit, or integrated coupling to a syringe or medical connector. For instance, the smooth profile 210 may form a syringe port that is conical and tapered to facilitate coupling with a syringe or medical connector, e.g., by a press-fit, interference fit, or other non-threaded connection. The diameter 233 of the second connector element 203 may be complementary to the male coupling of the syringe or medical connector. The second connector element 203 may have a maximum inner diameter 233 approximately equal to inner diameter 33 as described above. However, it is to be understood that the smooth profile 210 of the connection surface 209 may be tapered, e.g., from a maximum diameter to a minimum diameter, as desired or needed to complement a suitable male connector of a syringe or other medical connector.

In some embodiments, the connection surface 209 of the second connector element 203 may be formed from a flexible and/or resilient material. For instance, the entire second connector element may be formed from a flexible and/or resilient material in some embodiments. The second connector element 203 may be formed with enough flexibility to accommodate a syringe or medical connector coupling having a threaded profile. In this regard, the second connector element 203 may be configured to receive a connector coupling having either a smooth profile or a threaded profile. The present inventors have found that it may be particularly advantageous to provide a second connector element 203 configured to receive a variety of couplings therein, e.g., smooth or threaded, as such cross-functionality may enable the combination connector body 201 to be coupled with a wider variety of syringes, medical connectors, nutrition containers, or other vessels by a press-fit interference connection with the resilient material.

As seen in FIG. 4, the combination connector body 201 may additionally include a lumen extension tip 211. The lumen extension tip may include an inner surface 213 and a sidewall 212. The lumen extension tip 211 may form a lumen 204. The lumen 204 may form a lumen or channel 237 in fluid communication with the port 214. The lumen 204 has a distal end 242 near the first connector element 202 and a proximal end 243 near the port 214.

Referring now to FIG. 5, in another aspect of the present invention, the combination connector body 1 may be coupled to an enteral feeding system as shown. The feeding system 356 may include a combination connector body 301 and a feeding tube 325. The feeding tube 325 may be coupled to the combination connector body 301 on the proximal end 349 of the combination connector body 301.

As seen in FIG. 5, the combination connector body 301 may include a first connector element 302 configured to facilitate coupling with a wide mouth container or a medical connector. The first connector element 302 may include a first sidewall 305, a first thread profile 307, a bottom surface of the first sidewall 317, an outer surface of the first sidewall 316, and a bottom surface of the first connector element 318. The first connector element 302 may additionally include a gripping surface 315 on the first outer surface 316 of the first sidewall 305.

As seen in FIG. 5, the first connector element 302 may be configured to facilitate coupling to wide-mouth container or medical connector. The first sidewall 305 may have a first thread profile 307 configured to form a female coupling configured to receive a male threaded portion of the wide-mouth container or medical connector. The first thread profile 307 may be complementary to the male threaded portion of the wide-mouth container or medical connector. The first connector element 302 may have a diameter 332 approximately equal to inner diameter 32 as described above.

As seen in FIG. 5, the combination connector body 301 may additionally include a second connector element 303. The second connector element 303 may include a second sidewall 308, a connection surface 309, an outer surface of the second sidewall 319, a bottom surface of the second sidewall 320, and a bottom surface 321 of the second connector element. The second connector element 303 may include a lumen extension tip 311 extending radially through the second connector element 303. As will be described in further detail below, the second connector element 303 may have fluid communication with the port 314 via a lumen or channel 337 through the lumen extension tip 311. The second connector element 3 may have a distal end 40 near the proximal end 39 of the first connector element 2. For instance, the second connector element 303 may have a distal end 340 directly adjacent to the proximal end 339 of the first connector element 302. The second connector element 303 may additionally have a proximal end 341 near the distal end 342 of the lumen 304. For instance, the second connector element 303 may have a proximal end 341 directly adjacent to the distal end 342 of the lumen 304.

As seen in FIG. 5, the second connector element 303 may have a second thread profile 310 on a connection surface 309. The second thread profile 310 may be configured on the connection surface 309 of the second sidewall 308 to facilitate coupling to a syringe or medical connector. For instance, the second thread profile 310 may form a female coupling on the connection surface 309 configured to receive a male coupling of the syringe or medical connector. The second thread profile 310 may be complementary to the male threaded portion of the syringe or medical connector. The second connector element 303 may have an inner diameter 333 approximately equal to inner diameter 33 as described above.

As seen in FIG. 5, the combination connector body 301 may additionally include a lumen extension tip 311. The lumen extension tip 311 may include an inner surface 313 and a sidewall 312. The lumen extension tip 311 may form a lumen 304. The lumen 304 may form a lumen or channel 337 in fluid communication with the port 314. The lumen 304 has a distal end 342 near the first connector element 302 and a proximal end 343 near the port 314.

As seen in FIG. 5, the combination connector body 301 may additionally include a port 314. The port 314 may include an outer surface 322 and an inner surface 323. The port 314 may form a channel 337 that is in fluid communication with the lumen 304 as described above. The channel 337 may have a distal end 348 near the proximal end 343 of the lumen 304 and a proximal end 346 at a proximal end 349 of the combination connector body 3031. In some embodiments, the distal end 47 of the channel 337 may be directly adjacent to the proximal end 343 of the lumen 304. The port 314 may additionally include an inner diameter 335 approximately equal to inner diameter 35 as described above. The port 314 may facilitate coupling to a feeding tube 325 or enteral feeding accessory (see FIG. 5). For instance, the diameter 335 may correspond to an outer diameter 353 of a feeding tube 325. The port 314 may be coupled to a feeding tube 325 on the proximal end 345 of the port 314. The port 314 may be coupled to the lumen extension tip 311 on the distal end of the port 314 through a tapered section 350.

As seen in FIG. 5, a tapered section 350 may be formed between the channel 337 and the lumen 304. The tapered section 350 may have a distal end 351 formed at the proximal end 343 of the lumen, and a proximal end 352 formed at the distal end 346 of the channel 337. The tapered section 350 may have a first diameter 354 configured to couple with the proximal end 343 of the lumen 304. The tapered section 350 may additionally have a second diameter 355 configured to couple with the distal end 346 of the channel 337.

As seen in FIG. 5, the diameter 332 of the first connector element 302 may be greater than the second connector element diameter 333 and the lumen diameter 334. The second connector element 303 may have a diameter 333 that is less than the first connector element diameter 332. The lumen 304 may have a diameter 334 that is less than the channel diameter 335. The distal end 338 of the first connector element 302 may be directly adjacent to the distal end 348 of the combination connector body 301. The proximal end 339 of the first connector element 302 may be directly adjacent to the distal end 340 of the second connector element 303. The distal end 340 of the second connector element 303 may be directly adjacent to the proximal end 339 of the first connector element, and the proximal end 341 of the second connector element 303 may be directly adjacent to the distal end 346 of the channel 337. The lumen 304 may be concentric to the second connector element 303. The distal end 351 of the tapered section 350 may be directly adjacent to the proximal end 343 of the lumen 304. The proximal end 352 of the tapered section 350 may be directly adjacent to the distal end 346 of the channel 337. The proximal end 347 of the channel 337 may be near the proximal end 349 of the combination connector body 301. For instance, the proximal end 347 of the channel 337 may be directly adjacent to the proximal end 349 of the combination connector body 301.

As seen in FIG. 5, the combination connector body 301 may be coupled to a feeding tube 325 to form the feeding system 356. The feeding tube 325 may be coupled to the combination connector body 301 on the proximal end 349 of the combination connector body 301. The feeding tube 325 is coupled to the combination connector body 301 via the channel 337 in the port 314 of the combination connector body 301. For instance, the feeding tube 325 may be coupled to the combination connector body 301 via adhesive bonding, solvent bonding, or similar methods.

As seen in FIG. 5, the feeding system 356 may include a feeding tube 325. The feeding tube 325 may have an inner diameter 353, an outer surface 326, an inner surface 327, and an adhesive or solvent bond 324. The feeding tube 325 may additionally include a jejunal or gastric tube connection 328 at the proximal end 358 of the feeding tube 325. The feeding tube 325 may be coupled with a combination connector body 301 at the distal end 357 of the feeding tube 325. The enteral feeding tube may have a feeding tube connector at a distal end thereof. The feeding tube connector may be adapted to couple with a gastric feeding port or a jejunal feeding port.

Figure 6:
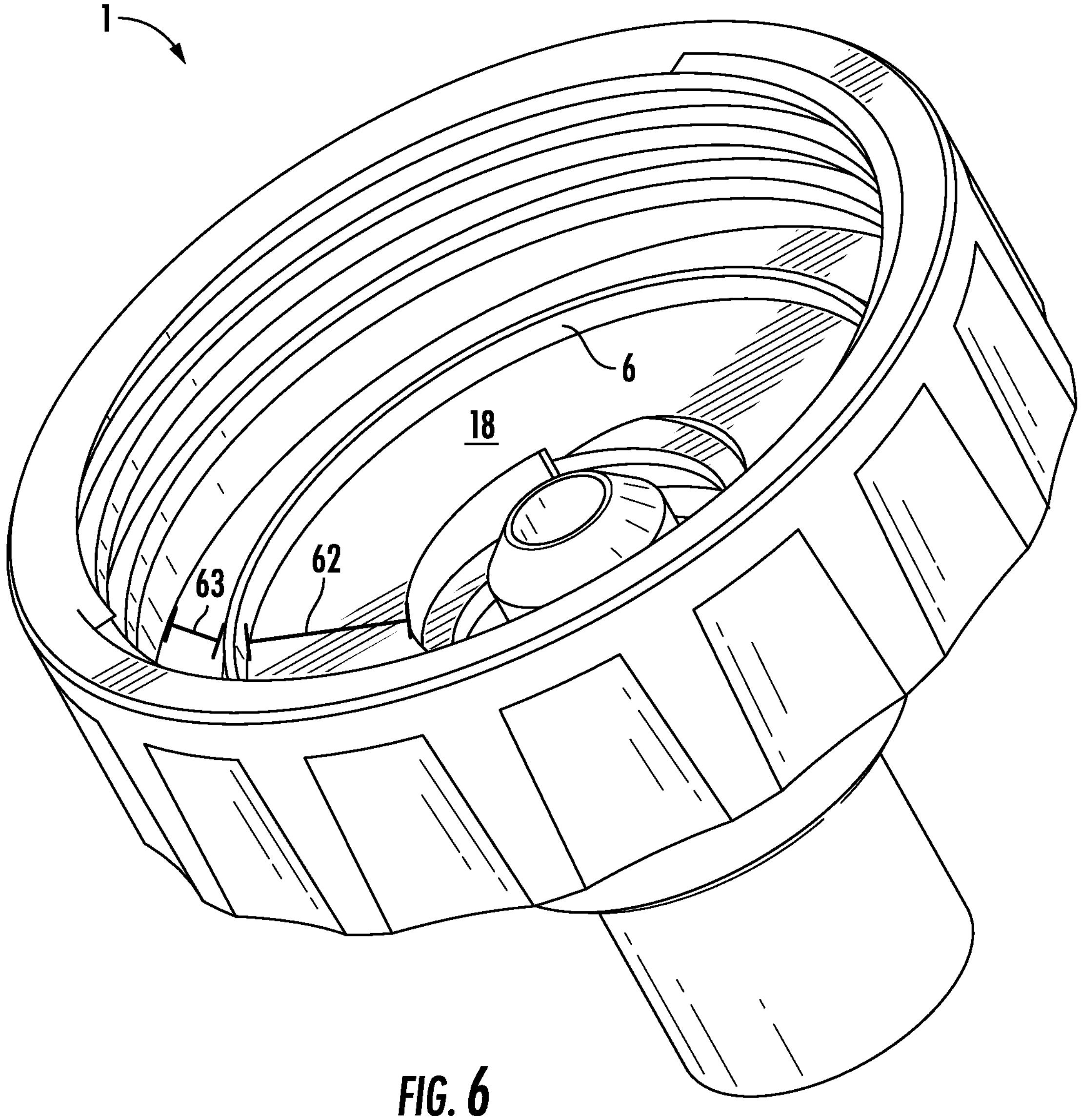
FIG. 6 illustrates a perspective view of a combination connector body with a circular flange according to one particular embodiment of the present disclosure.
Figure 7:
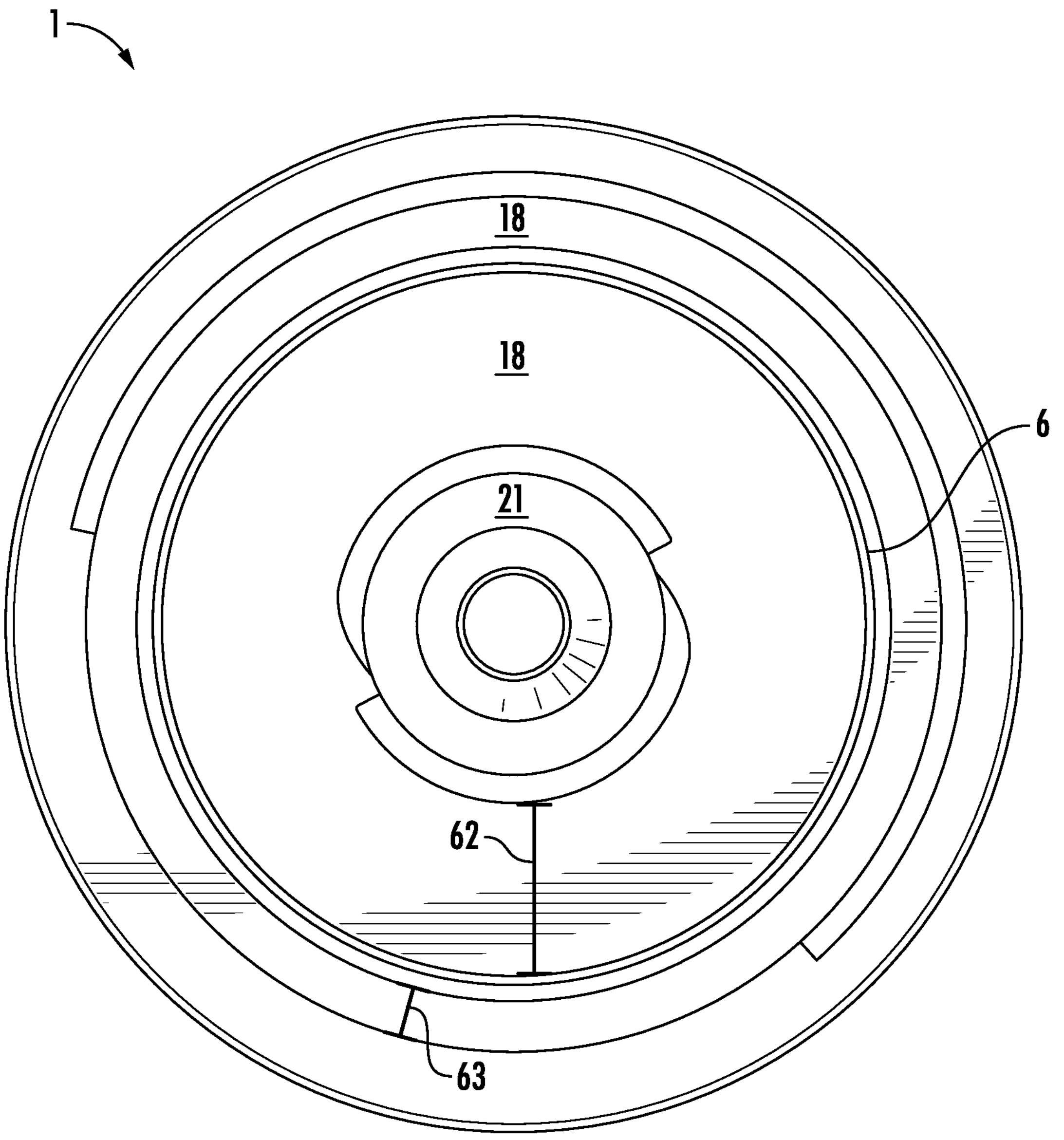
FIG. 7 illustrates a perspective view of a combination connector body with a circular flange according to one particular embodiment of the present disclosure.
Figure 8:
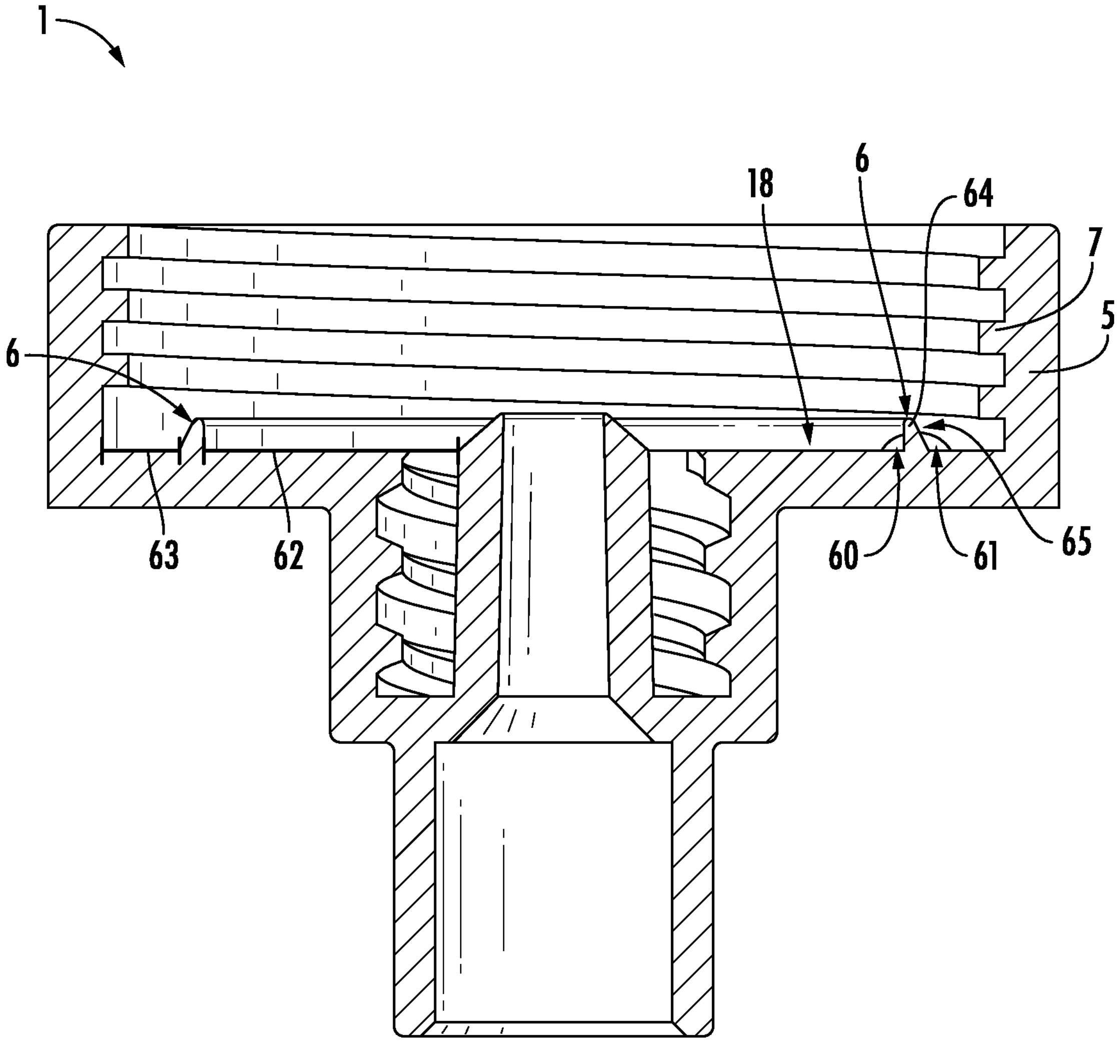
FIG. 8 illustrates a cross-sectional view of a combination connector body with a circular flange according to one particular embodiment of the present disclosure.

Referring now to FIGS. 6, 7, and 8, in another aspect of the present invention, the combination connector body 1 with a circular flange 6 on an inner surface of the a first connector element is shown. While FIGS. 6-8 illustrate a combination connector body 1 similar to that of FIG. 1, it is to be understood that the circular flange 6 may be provided in combination with any of the embodiments or aspects of the present invention disclosed here.

As best seen in FIG. 7, the flange 6 extends along the bottom surface 18 of the first connector element 2 to create an essentially circular extension protruding inward from the bottom surface 18. In some aspects, e.g., as illustrated in FIG. 8, the flange 6 may have a triangular cross-section. The flange 6 may have an inner surface 64 that forms an approximately 90-degree angle 60 with the bottom surface 18 of the first connector element 2. The flange 6 may additionally include an outer surface 65 forming a greater than 90-degree angle 61 (i.e., an obtuse angle) with the bottom surface 18 of the first connector element 2.

As best seen in FIG. 8, the flange 6 may be spaced apart from the first thread profile 7 by a distance 63 measured between the first thread profile 7 to the outer surface 65 of the circular flange 6. The flange 6 may additionally be spaced apart from the second connector element 3 by a distance 62 measured from the inner surface 64 of the flange 6 to the connection surface 9 of the second connector element 3. The distance 63 may be in a range from about 1 mm to about 8 mm. The distance 62 may be in a range from about 1 mm to about 6 mm.

Further aspects of the invention are provided by one or more of the following embodiments:

A connector component includes a connector body having: a first connector element comprising a first sidewall, a first thread profile on an inner surface of the first sidewall, the first thread profile being configured to couple with a threaded fitting of a wide-mouth connector; a second connector element comprising a second sidewall, an inner surface of the second sidewall comprising a connection surface configured to couple with a medical connector; and a port configured to couple to tubing. The first connector element has an inner diameter greater than an outer diameter of the second connector element. The second connector element has an inner diameter greater than the lumen. The first connector element is coaxial with the second connector element, and the second connector element is concentric with the lumen. The first connector element, the second connector element, and the port are formed as one piece.

The connector component of any one or more of the embodiments, wherein the second connector element has a diameter smaller than a diameter of the first connector element.

The connector component of any one or more of the embodiments, wherein the connection surface comprises a second thread profile configured to engage with the medical connector.

The connector component of any one or more of the embodiments, wherein the second thread profile is compliant with the ISO 80369-3 enteral connector standard.

The connector component of any one or more of the embodiments, wherein the connector body comprises a rigid plastic material.

The connector component of any one or more of the embodiments, wherein the second connector element comprises a flexible material.

The connector component of any one or more of the embodiments, wherein the connection surface comprises a smooth surface, further wherein the connection surface is configured to flex to receive a threaded outer surface of the medical connector.

The connector component of any one or more of the embodiments, wherein the first thread profile is configured to couple with an off-the-shelf enteral nutrition carton, or other container filled with enteral nutrition.

The connector component of any one or more of the embodiments, wherein the connection surface is configured to facilitate a direct connection between the second sidewall and a syringe.

The connector component of any one or more of the embodiments, wherein the lumen extends axially through the second connector element and the port.

The connector component of any one or more of the embodiments, wherein the connection surface and the lumen extension tip are configured to facilitate a press-fit interference connection with the medical connector.

The connector component of any one or more of the embodiments, wherein the first connector element has an inner surface texture configured to facilitate air passage or air venting during use.

The connector component of any one or more of the embodiments, wherein the second connector element is concentric to the first connector element.

The connector component of any one or more of the embodiments, wherein the first connector element has a circular flange on a bottom surface of the first connector element.

The connector component of any one or more of the embodiments, further comprising a lumen extension tip extending from a bottom of the second connector element and disposed within the second connector element, the lumen extension tip having an inner surface and an outer surface, the inner surface of the lumen extension tip defining a lumen.

The connector component of any one or more of the embodiments, wherein the lumen extension tip is coaxial with the first connector element and the second connector element.

The connector component of any one or more of the embodiments, wherein the lumen extension tip is formed as one piece with the first connector element and the second connector element.

An enteral feeding system includes a connector component and tubing coupled to the connector component. The connector component includes a first connector element comprising a first sidewall, a first thread profile on an inner surface of the first sidewall, the first thread profile being configured to couple with a threaded fitting of a wide-mouth connector; a second connector element comprising a second sidewall, an inner surface of the second sidewall comprising a connection surface configured to couple with a medical connector; and a port. The tubing is coupled to the port.

The enteral feeding system of any one or more of the embodiments, wherein the connector component is fixed to a tubing.

The enteral feeding system of any one or more of the embodiments, wherein the tubing is coupled to the port by a solvent bond or an adhesive bond.

The enteral feeding system of any one or more of the embodiments, wherein the tubing comprises a flexible material.

The enteral feeding system of any one or more of the embodiments, wherein the tubing is coupled to the port at a proximal end thereof and the tubing comprises a feeding tube connector at a distal end thereof.

The enteral feeding system of any one or more of the embodiments, wherein the enteral feeding system is adapted to couple with a gastric feeding port or a jejunal feeding port.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other examples are intended to be within the scope of the claims, or if they include equivalent structural elements with insubstantial differences from the literal language of the claims.

What is claimed is:

1. A connector component comprising:

a connector body having:

a first connector element comprising a first sidewall, a first thread profile on an inner surface of the first sidewall, a bottom surface defining a proximal end of the first connector element, and a distal end opposite the proximal end, the first thread profile being configured to couple with a threaded fitting of a wide-mouth connector, a second connector element comprising a second sidewall, an inner surface of the second sidewall comprising a connection surface configured to couple with a medical connector, the bottom surface of the first connector extending radially in a plane between the first sidewall and the second sidewall, the second sidewall extending directly from the bottom surface of the first connector, and a port configured to couple to a tubing;

the first connector element having an inner diameter greater than an outer diameter of the second connector element, the bottom surface of the first connector having a proximal exterior surface extending radially outward from the outer diameter of the second connector element, the second connector element having an inner diameter greater than an inner diameter of the port, the first connector element being coaxial with the second connector element, wherein the first connector element, the second connector element, and the port being formed as one piece, wherein the second connector element comprises a distal end terminating at the bottom surface of the first connector element, and wherein the second connector element extends in a direction away from the distal end of the first connector element.

2. The connector component of claim 1, wherein the connection surface comprises a second thread profile configured to engage with the medical connector.

3. The connector component of claim 2, wherein the second thread profile is compliant with a ISO 80369-3 enteral connector standard.

4. The connector component of claim 1, wherein the connector body comprises a rigid plastic material.

5. The connector component of claim 1, wherein the second connector element comprises a flexible material.

6. The connector component of claim 5, wherein the connection surface comprises a smooth surface, further wherein the connection surface is configured to flex to receive a threaded outer surface of the medical connector.

7. The connector component of claim 1, wherein the first thread profile is configured to couple with an off-the-shelf enteral nutrition carton, or other container filled with enteral nutrition.

8. The connector component of claim 1, wherein the connection surface is configured to facilitate a direct connection between the second sidewall and a syringe.

9. The connector component of claim 1, wherein:

a lumen extension tip comprises a lumen extends axially through the second connector element, the lumen defining a lumen diameter, and the port defining a channel diameter that is greater than the lumen diameter.

10. The connector component of claim 1, wherein the connection surface and a lumen extension tip are configured to facilitate a press-fit interference connection with the medical connector, and wherein the lumen extension tip extends beyond the bottom surface of the first connector and terminates prior to the distal end of the first connector.

11. The connector component of claim 1, wherein the first connector element has an inner surface texture configured to facilitate air passage or air venting during use.

12. The connector component of claim 1, wherein:

the first sidewall comprises a first cylindrical outer surface and the second sidewall comprises a second cylindrical outer surface, the proximal exterior surface extends from the first cylindrical outer surface to the second cylindrical outer surface, and the second cylindrical outer surface is concentric to the first cylindrical outer surface.

13. The connector component of claim 1, wherein the first connector element has a circular flange on a bottom surface of the first connector element.

14. The connector component of claim 1, further comprising a lumen extension tip having an inner surface and an outer surface, the inner surface of the lumen extension tip defining a lumen, wherein the bottom surface is a first bottom surface, wherein the second connector element comprises a second bottom surface defining a proximal end of second connector, wherein the lumen extension tip comprises a proximal end coupled to the second bottom surface and a distal end positioned proximate the first bottom surface.

15. An enteral feeding system comprising:

a connector component comprising:

a first connector element comprising a first sidewall, a first thread profile on an inner surface of the first sidewall, a bottom surface defining a proximal end of the first connector element, and a distal end opposite the proximal end, the first thread profile being configured to couple with a threaded fitting of a wide-mouth connector, a second connector element comprising a second sidewall, an inner surface of the second sidewall comprising a connection surface configured to couple with a medical connector, the bottom surface of the first connector extending radially in a plane between the first sidewall and the second sidewall, the bottom surface of the first connector having a proximal exterior surface extending radially outward from an exterior surface defining an outer diameter of the second connector, the second sidewall extending directly from the bottom surface of the first connector, the second connector element comprising a distal end terminating at the bottom surface of the first connector, wherein the second connector element extends from the bottom surface of the first connector element in a direction away from the distal end of the first connector element, a port extending from a proximal end of the second connector; and a tubing coupled to the port.

16. The enteral feeding system of claim 15, wherein the tubing is coupled to the port by a solvent bond or an adhesive bond.

17. The enteral feeding system of claim 15, wherein the tubing comprises a flexible material.

18. The enteral feeding system of claim 15, wherein the tubing is coupled to the port at a proximal end thereof and the tubing comprises a feeding tube connector at a distal end thereof.

19. The enteral feeding system of claim 15, wherein the enteral feeding system is adapted to couple with a gastric feeding port or a jejunal feeding port.

20. The connector component of claim 1, wherein the port extends from a proximal end of the second connector element.

21. The connector component of claim 1, wherein the bottom surface defines a continuous interior surface extending from the inner surface of the first connector to the inner surface of the second connector, and wherein the continuous interior surface extends substantially parallel to the proximal exterior surface on the same plane.

* * * * *